United States Patent [19]
Saurin et al.

[11] Patent Number: 5,645,148
[45] Date of Patent: Jul. 8, 1997

[54] TRANSMISSION WITH BUILT-IN BRAKE, PARTICULARLY FOR VEHICLES

[75] Inventors: Claudio Saurin, Rubano; Giampietro Rizzo, Este, both of Italy

[73] Assignee: ZF Padova S.p.A., Caselle Di Selvazzano Dentro, Italy

[21] Appl. No.: 494,644

[22] Filed: Jun. 23, 1995

[51] Int. Cl.$^6$ .......................... B60K 41/26; F16D 41/24; F16D 65/14
[52] U.S. Cl. .................. 192/4 A; 475/331; 188/106 F
[58] Field of Search .................. 475/331; 192/4 A; 180/372; 188/106 F, 106 A, 106 P, 72.7

[56] References Cited

U.S. PATENT DOCUMENTS

| | | | |
|---|---|---|---|
| 3,106,268 | 10/1963 | Christenson et al. | 188/106 F |
| 3,482,665 | 12/1969 | Meier | 188/106 F |
| 3,507,367 | 4/1970 | Brown et al. | 188/106 F |
| 4,037,694 | 7/1977 | Keese | 192/4 A |
| 4,142,615 | 3/1979 | Sidles, Jr. et al. | 192/4 A X |
| 5,038,895 | 8/1991 | Evans | 188/106 F X |
| 5,147,255 | 9/1992 | Streheler et al. | 192/4 A X |

*Primary Examiner*—Khoi Q. Ta
*Attorney, Agent, or Firm*—Guido Modiano; Albert Josif

[57] ABSTRACT

A transmission with built-in brake, particularly for vehicles, comprising an oil bath inside a containment and supporting casing, an epicyclic reduction unit kinematically connected to a power unit by means of at least two gears, of which the driven gear is axially fixed, coaxial to the sun gear and associated therewith by means of a splined coupling. A disk brake is arranged between the epicyclic reduction unit and the driven gear, so that at least one first disk is rigidly coupled to an internally-toothed ring gear rigidly coupled to the casing and so that at least one second disk is rigidly coupled so as to rotate together with the driven gear. The disk brake is associated with pusher means for packing that can move axially. Moreover, the pusher means comprise a flange, the piston of a fluid-activated actuator integrated in the casing acting on the flange. A pivot is rigidly coupled to the flange and protrudes from the casing. Respective actuation means act on the actuator and on the pivot.

5 Claims, 2 Drawing Sheets

TRANSMISSION WITH BUILT-IN BRAKE, PARTICULARLY FOR VEHICLES

BACKGROUND OF THE INVENTION

The present invention relates to an improved transmission with built-in brake, particularly for vehicles.

Electric power units are usually used in vehicles for indoor transport, such as for example fork-lift trucks; each one of these drive units, coupled to a transmission, forms a propulsion unit.

The transmission disclosed in U.S. Ser. No. 08/131,244 of Oct. 4, 1993, is known among transmissions adapted for these propulsion units.

This transmission includes, in an oil-bath casing, an epicyclic reduction unit that is kinematically connected to the power unit by means of two gears, the driven gear being axially fixed, coaxial to the sun gear and associated therewith by means of a splined coupling.

A disk brake is arranged between the epicyclic reduction unit and the driven gear and has disks that are alternately rigidly coupled so as to rotate together with the former or with the latter.

The disk brake is associated with a pusher that is connected by means of axial pins that pass through the driven gear in adapted holes thereof and are associated with a pusher flange from which a pivot extends; said pivot protrudes from the casing, and thrust applying means act thereon.

These actuation means, disclosed in Italian patent application PD 92 A 000177 of Oct. 19, 1992, comprise a first-class lever that is pivoted on the lid of the containment casing and acts with a first arm on the pusher pivot protruding from said casing.

The lever acts with a second arm on the piston of a fluid-activated cylinder whose body is monolithic with the lid.

In the practical embodiment of the above described transmission it has been observed that, although it solves several drawbacks of previous solutions, it is still not optimum from the point of view of constructive simplicity and therefore of operating reliability.

In this transmission, particularly in the part related to the actuation of the disk brake, there is a large number of moving parts and therefore of parts subject to wear.

Furthermore, the actuation lever moves both when the fluid-activated cylinder is operated (braking during normal use) and when acting on said lever by means of a cable-operated control (parking brake).

The lever is also subjected to very intense forces to pack the disks.

SUMMARY OF THE INVENTION

The principal aim of the present invention is to provide an improved transmission for vehicles that eliminates or substantially reduces the drawbacks described above in known types.

A consequent primary object is to provide a transmission composed of a smaller number of parts and constructively simpler.

Another object is to provide a transmission that is subjected to a wear that is below the current level.

Another object is to provide a transmission that can be manufactured with conventional equipment and systems.

This aim, these objects, and others which will become apparent hereinafter are achieved by an improved transmission with built-in brake, particularly for vehicles, of the type comprising, in an oil bath inside a containment and supporting casing, an epicyclic reduction unit kinematically connected to a power unit by means of at least two gears, of which the driven gear is axially fixed, coaxial to the sun gear and associated therewith by means of a splined coupling, a disk brake being arranged between said epicyclic reduction unit and said driven gear, so that at least one first disk is rigidly coupled to an internally-toothed ring gear that is rigidly coupled to said casing and so that at least one second disk is rigidly coupled so as to rotate together with said driven gear, said disk brake being associated with axially movable pusher means for packing, said transmission being characterized in that said pusher means comprise a flange, a piston of a fluid-activated actuator, integrated in the casing, acting on said flange, a pin being rigidly coupled to said flange and protruding from said casing, actuation means acting on the actuator and on the pin.

BRIEF DESCRIPTION OF THE DRAWINGS

Further features and advantages of the invention will become apparent from the detailed description of a preferred embodiment thereof, illustrated only by way of non-limitative example in the accompanying drawings, wherein.

DESCRIPTION OF THE PREFERRED EMBODIMENTS

Figure 1:
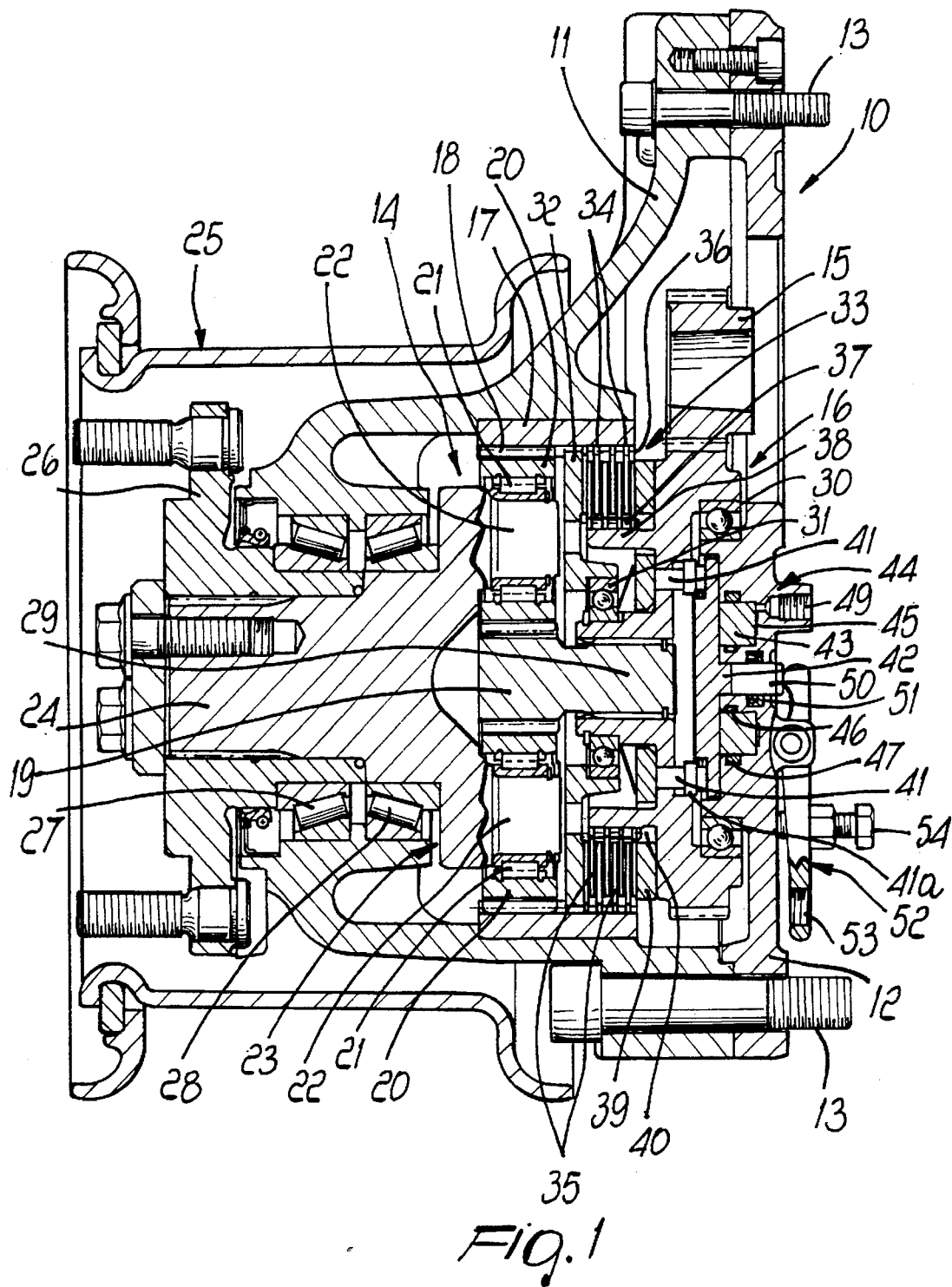
FIG. 1 is a longitudinal sectional view of the transmission with built-in brake.
Figure 2:
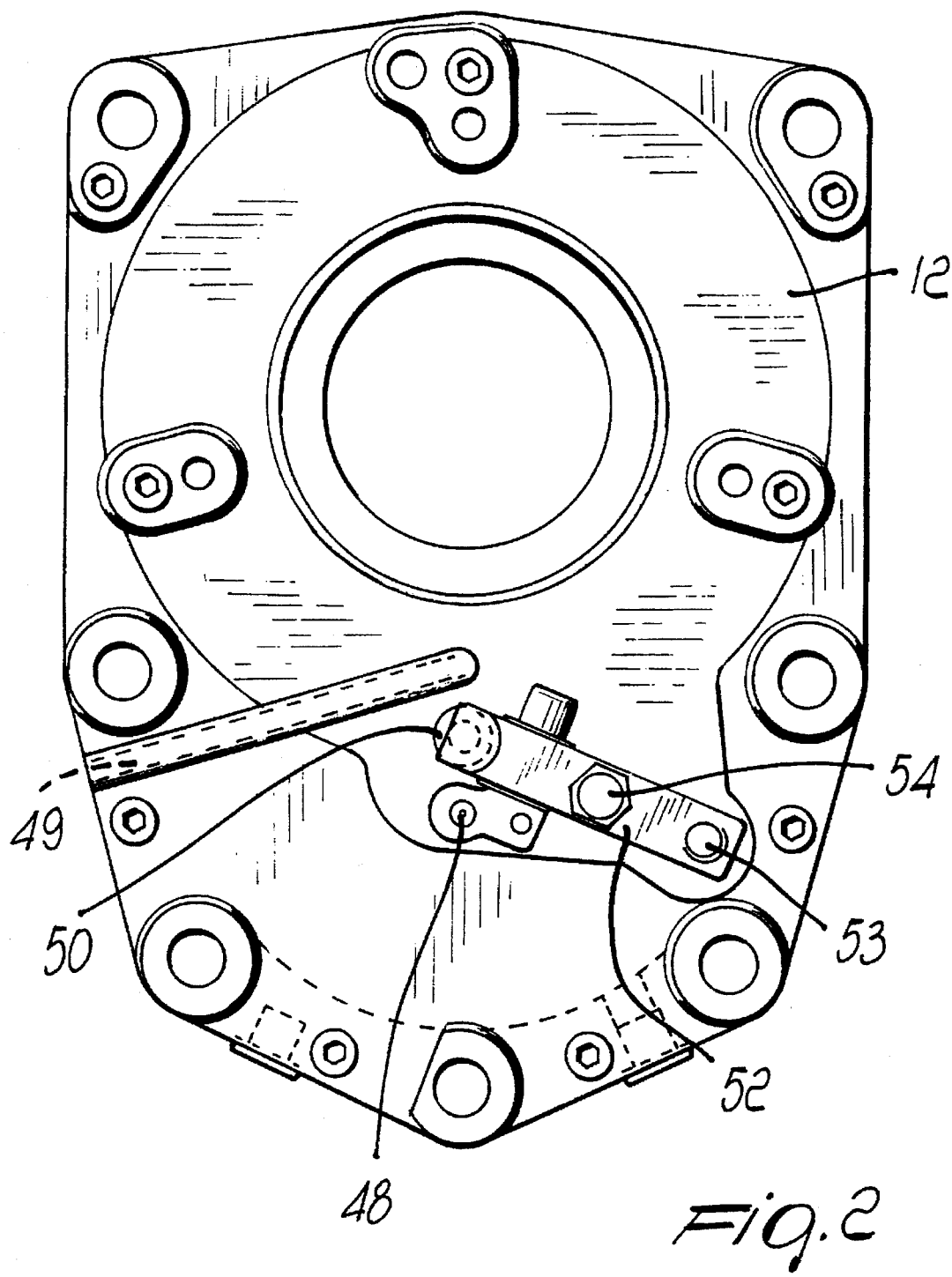
FIG. 2 is a front view of the lid of the casing containing the transmission of FIG. 1.

With reference to the above figures, a casing 10, with a bell-shaped containment body 11 and a plate-like lid 12 that are mutually bolted by means of bolts 13, contains an epicyclic reduction unit 14 that is kinematically connected to a power unit, not shown in the figures, and constituted for example by an electric motor.

The kinematic coupling is provided by means of two gears: a pinion 15, which is keyed on the drive shaft of the power unit, and a driven gear 16, which is arranged coaxially to the epicyclic reduction unit 14.

More particularly, the epicyclic reduction unit 14 comprises a gear 17 constituted by a ring 18 with internal teeth that is rigidly coupled to the casing 10, by a sun gear 19 constituted by a pinion with external teeth, and by the planet gears 20 that mesh with the ring 18 and with the sun gear 19.

The planet gears 20 are rotatably coupled, by means of bearings 21, to respective journals 22 that extend from a spider 23, an axial extension 24 whereof constitutes the shaft for a wheel 25.

A flange 26 for supporting the wheel 25 is associated with the axial extension 24 by means of a splined coupling, and both are rotatably coupled to the body 11 by means of bearings 27 and 28 that are adapted for radial and axial loads.

The sun gear 19 is provided with an axial extension 29 that constitutes a hub which is connected to, and rotates with, the driven gear 16 by means of a splined coupling.

Said driven gear 16 has seats for two rotary bearings, of which a first one 30 is connected perimetrically to the lid 12 and a second one 31 is perimetrically connected to a ring 32 that is adjacent to the planet gears 20.

A disk brake, generally designated by the reference numeral 33, is arranged between the reduction unit 14 and the driven gear 16 and is composed of a first group of disks 34 rigidly coupled to the gear 17 and by a second group of disks 35 rigidly coupled to the driven gear 16.

The disks of the first group 34 are arranged in alternation with those of the second group 35.

The disks of the second group 34 have an external set of teeth that meshes with an extension 36 of the set of teeth 36, which therefore also acts as a disk support.

The second group of disks 35 instead has an internal set of teeth that meshes with a set of teeth 37 of a tubular projection 38 of the gear 16, which thus acts as a disk support.

The packing of the disks of the groups 34 and 35 is achieved by a disk-like pusher 39 that is provided with slots 40; the sectors into which the projection 38 is divided conveniently pass through said slots.

The pusher 39 is connected to axial pins 41 that pass through said driven gear 16 in adapted holes thereof and are associated, with the interposition of an axial bearing 41a, with a pusher flange 42.

According to the invention, said flange 42, on the opposite side with respect to said axial pins 41, is directly in contact with an annular piston 43 of a fluid-activated actuator, generally designated by the reference numeral 44, that is integrated in the lid 12 of the casing 10.

The actuator 44 also comprises, in addition to the piston 43, the seat 45 for the sliding of said piston, appropriate sealing rings 46 and 47, and ports 48 and 49 respectively for feeding hydro-dynamic fluid and for venting.

The hydro-dynamic brake actuation circuit, not shown, is connected to said port 48, which is appropriately threaded; said circuit is activated for example by a pedal located in the control section of the vehicle.

This connection can be provided by means of rigid tubes.

The port 49 is at right angle to the port 48 and runs parallel to the outer surface of the lid 12.

This solution for the arrangement of the ports 48 and 49 allows to install the tube of the brake actuation circuit inside the vehicle and to install the vent outside the vehicle.

Also according to the invention, a pin 50 extends from the flange 42 axially, and therefore in a region that lies inside the annular piston 43; said pin 50 protrudes from the lid 12, which is provided with a sealing ring 51 in the passage port, and a actuation lever 52, pivoted in said lid 12, acts on said pin.

The lever 52 has, at the actuation end, a threaded through hole 53, on which it is possible to connect the end portion of a cable-operated control that is not shown (parking brake).

The lever 52 is also provided with a play adjustment screw 54 that is screwed in an axial threaded through hole of said lever and in abutment against the lid 12.

From the foregoing, as regards the packing of the disks of the brake 33, only the parking brake, which is used less frequently, acts on the actuation lever 52, whereas the ordinary actuation control acts directly on the pusher flange 42 by means of the fluid-activated actuator 44 that is built into the casing 10.

This has the first advantage of a better thrusting action during ordinary use as regards both the amount and the distribution of the force.

During actuation of the parking brake, the fluid-activated actuator 44 does not move and therefore does not create disturbance in the hydro-dynamic braking circuit as might be caused by low pressures produced inside said actuator.

The reduction in yielding in the new pusher system with respect to known types has allowed to eliminate flexing almost entirely.

Furthermore, the lever 52, with respect to known actuation types, is no longer subjected to continuous movements under stress and therefore to wear.

Finally, the brake packing thrust is achieved with a smaller number of elements than in known types, and this achieves greater constructive simplicity of the entire unit.

A smaller number of parts accordingly means a smaller number of elements that can wear or break and therefore greater reliability.

In practice it has been observed that the intended aim and objects of the present invention have been achieved.

The invention thus conceived is susceptible of numerous modifications and variations, all of which are within the scope of the inventive concept.

All the details may furthermore be replaced with other technically equivalent elements.

In practice, the materials employed, so long as they are compatible with the contingent use, as well as the dimensions, may be any according to the requirements.

What is claimed is:

1. A transmission with built-in brake, particularly for vehicles, comprising:

a containment and supporting casing enclosing an oil bath;

an epicyclic reduction unit;

at least two gears for transmitting motion to said epicyclic unit, a driven gear of said two gears being axially fixed and coaxial to a sun gear of said epicyclic unit and coupled therewith through a splined coupling;

a disk brake arranged between said epicyclic reduction unit and said driven gear, said disk brake having at least one first disk being rigidly coupled to an internally-toothed ring gear which is fixedly connected to said casing, and at least one second disk being rigidly coupled to and rotatable together with said driven gear;

axially movable pusher means for packing together said first and second disks of said brake, wherein said pusher means comprise: a flange; a fluid-activated actuator including a piston integrated in said casing and acting on said flange; a pin rigidly coupled to said flange and protruding from said casing; and actuation means acting on said actuator and on said pin; wherein said fluid-activated actuator comprises in addition to said piston: an annular seat built into a lid of said casing for sliding of said piston; sealing rings; and ports for feeding hydro-dynamic fluid and for venting; and wherein said actuation means comprise a parking brake system acting on said pin; and wherein said venting port lies at a right angle to the feed port and runs parallel to an outer surface of said lid.

2. Transmission according to claim 1, wherein said piston is annular and extends axially on an opposite side with respect to said brake and acts directly on said flange.

3. Transmission according to claim 1, wherein said pin protruding from said casing extends axially and is surrounded by said piston of said fluid-activated actuator.

4. Transmission according to claim 3, wherein said parking brake system comprises an actuation lever which acts on said pin, which is pivoted on said lid, and which is actuated by a parking brake cable-operated control.

5. Transmission according to claim 4, wherein said lever is provided with a play adjustment screw that rests on said lid.

* * * * *